(12) United States Patent
Oh et al.

(10) Patent No.: US 12,012,805 B2
(45) Date of Patent: Jun. 18, 2024

(54) VARIABLE LIGHT TRANSMISSION PANEL AND DOOR HAVING THE SAME

(71) Applicant: INTOSEE CO. LTD, Cheonan-si (KR)

(72) Inventors: Jae Hwan Oh, Cheonan-si (KR); Chan Ho Kim, Cheonan-si (KR); Eun Seon Chi, Cheonan-si (KR); Ye Lin Han, Cheonan-si (KR)

(73) Assignee: INTOSEE CO. LTD, Cheonan-si (KR)

( * ) Notice: Subject to any disclaimer, the term of this patent is extended or adjusted under 35 U.S.C. 154(b) by 478 days.

(21) Appl. No.: 17/417,655

(22) PCT Filed: Sep. 1, 2020

(86) PCT No.: PCT/KR2020/011681
§ 371 (c)(1),
(2) Date: Jun. 23, 2021

(87) PCT Pub. No.: WO2021/145530
PCT Pub. Date: Jul. 22, 2021

(65) Prior Publication Data
US 2022/0178199 A1    Jun. 9, 2022

(30) Foreign Application Priority Data
Jan. 16, 2020   (KR) .......................... 10-2020-0005893

(51) Int. Cl.
*E06B 9/24*    (2006.01)
*E06B 3/67*    (2006.01)
(Continued)

(52) U.S. Cl.
CPC .............. *E06B 9/24* (2013.01); *E06B 3/6722* (2013.01); *F21V 33/0016* (2013.01);
(Continued)

(58) Field of Classification Search
CPC .............. E06B 9/24; E06B 2009/2464; E06B 2009/27; E06B 3/6722; H05B 47/115; F21V 33/0016
See application file for complete search history.

(56) References Cited

U.S. PATENT DOCUMENTS 11,003,032 B2 * 5/2021 Oh ....................... G02F 1/13306
2009/0059368 A1 * 3/2009 Kamada ............ B32B 17/10458
977/773
(Continued)

FOREIGN PATENT DOCUMENTS

JP          05-040552 U      6/1993
KR   10-2012-0014879 A       2/2012
(Continued)

*Primary Examiner* — Tracie Y Green
*Assistant Examiner* — Michael Chiang
(74) *Attorney, Agent, or Firm* — NKL LAW; Jae Youn Kim (57) ABSTRACT

A door, which includes a variable light transmission panel and a frame and is mounted on a body by a hinge so as to be opened and closed, is disclosed, and the door includes a glass member provided on a front surface side of the frame, a protective panel provided on an inner surface side of the frame, the variable light transmission panel provided between the glass member and the protective panel and including a sheet made of a thermoplastic resin of polymethyl methacrylate (PMMA) or polycarbonate (PC) and nano-sized dyes, a light-emitting member provided between the protective panel and the variable light transmission panel, and a power supply member configured to supply power to the light-emitting member.

11 Claims, 8 Drawing Sheets

(51) Int. Cl.
*F21V 33/00* (2006.01)
*H05B 47/115* (2020.01)
*F21Y 115/10* (2016.01)

(52) U.S. Cl.
CPC .... *H05B 47/115* (2020.01); *E06B 2009/2464* (2013.01); *E06B 2009/247* (2013.01); *F21Y 2115/10* (2016.08)

(56) References Cited

U.S. PATENT DOCUMENTS

| | | | |
|---|---|---|---|
| 2011/0120540 A1* | 5/2011 | Huang | H01G 9/2063 |
| | | | 136/255 |
| 2013/0061542 A1* | 3/2013 | Weidner | H01L 31/0488 |
| | | | 52/173.3 |
| 2013/0164521 A1* | 6/2013 | Myoung | H01G 9/20 |
| | | | 428/312.6 |
| 2014/0076600 A1* | 3/2014 | Browning | H05K 5/0243 |
| | | | 977/773 |
| 2014/0102526 A1* | 4/2014 | Matsuo | H01G 9/2013 |
| | | | 136/255 |
| 2018/0004018 A1 | 1/2018 | Oron et al. | |
| 2020/0332593 A1* | 10/2020 | Ribberink | E06B 9/24 |

FOREIGN PATENT DOCUMENTS

KR 10-1841672 B1 3/2018
KR 10-2018-0119248 A 11/2018

\* cited by examiner

FIG. 1
PRIOR ART

OFF

VARIABLE LIGHT TRANSMISSION PANEL AND DOOR HAVING THE SAME

TECHNICAL FIELD

The present invention relates to a variable light transmission panel and a door having the same, and more particularly, to a variable light transmission panel through which an article inside a body can be confirmed from the outside by blocking light incident from the outside and allowing external light to pass therethrough according to an increase in the amount of light by an internal light source, and a door having the same.

BACKGROUND ART

In general, an anti-reflective coating is a technique for reducing light reflection generated on a surface of an optical substrate such as glass or plastic by executing a coating, which satisfies specific optical characteristics, on the surface of the substrate. The anti-reflective coating has been applied not only to a product field that reduces surface reflectivity by applying the anti-reflective coating to a surface of an optical lens, such as a glass, a display, and a camera, to suppress interference caused by the reflection, but also, in recent years, to a technology for improving the amount of sunlight accumulation by improving the transmittance of a solar panel. Among these, an anti-reflective coating using porous silica particles has been subjected to various studies for the development of a refractive index matching coating film using the properties of a porous material capable of adjusting a refractive index.

Meanwhile, schools, laboratories, hospitals, and the like have doors that do not transmit light in order to block light from chemicals, volatile substances, explosive substances, chemical substances, and the like that react to light such as sunlight and indoor lighting. Accordingly, there is no way to confirm an internal state other than opening the door to confirm the inside, or there is no way to see the internal state without using a special device.

In particular, even when chemicals leak, toxic gases are formed, or a fire occurs inside a storage box, danger is increased because it cannot be immediately known, and when a user opens the door in this case, the user has to open the door without confirming the internal state, which is very dangerous to the user.

An example of a technique for solving such a problem is disclosed in Patent Documents 1 to 3 below.

For example, Korean Registered Patent Publication No. 10-1159538, (registered on Jun. 19, 2012, Patent Document 1) discloses a semi-transmissive reflective sheet 1 including a base substrate layer 2 made of a polycarbonate-based resin, which is a colorless and transparent synthetic resin, and titanium oxide particles 3 contained in the base substrate layer 2 and having a particle diameter of 0.05 µm or more and 1 µm or less, wherein the base substrate layer 2 has a fine concavo-convex shape 4 formed on an entire surface thereof in a sheet shape, a thickness (average thickness) of the base substrate layer 2 is formed to be 30 µm or more and 200 µm or less, and preferably 40 µm or more and 100 µm or less, an arithmetic average roughness (Ra) of the surface of the base substrate layer is 0.8 µm or more and 3 µm or less, and when light is incident from the surface side of the base substrate layer 2, light transmittance is 1% or more and 30% or less, and light reflectance is 70% or more and 99% or less.

Further, Korean Patent Application Publication No. 2019-0045981 (published on May 7, 2019, Patent Document 2) discloses an anti-reflective film including a base substrate formed to include a UV curable resin, and porous particles, each of which has a diameter of 200 to 300 nm and which are impregnated in a certain ratio on a surface of the base substrate and arranged in a single layer to form a core-shell structure, wherein the anti-reflective film is a film in which particle exposure is further increased by selectively etching only a polymer resin layer, not a particle area, through 02 atmospheric pressure plasma treatment.

Meanwhile, Korean Registered Patent Publication No. 10-1975757, (registered on Apr. 30, 2019, Patent Document 3) discloses a state-detection see-through storage box including a storage box body in which an article is stored, a sensor configured to detect a specific state inside the storage box, a door installed on the storage box body and having a transparent window, a light-emitting module that increases the amount of light reflected from the inside of the storage box and directed toward the transparent window by increasing a light-emission amount according to a signal from the sensor configured to detect a specific state inside the storage box, and an optical film provided in the transparent window, to allow a specific state inside the storage box body to be identified.

DISCLOSURE

Technical Problem

The above-described technique disclosed in Patent Document 1 relates to a structure in which light is emitted from a lamp to be dispersed from one light guide plate to front and rear surface sides, and thus has a problem that it cannot be applied to a structure that blocks light incident from the outside and allows external light to pass therethrough according to an increase in the amount of light by an internal light source to confirm an article inside a body from the outside.

Further, the above-described technique disclosed in Patent Document 2 provides a film with additionally increased particle exposure by selectively etching only a polymer resin layer, not a particle area, but has a problem, similar to Patent Document 1, that it cannot be applied to a structure that blocks light incident from the outside and allows external light to pass therethrough according to an increase in the amount of light by an internal light source to confirm an article inside a body from the outside.

Meanwhile, in Patent Document 3, sensors such as a temperature sensor for detecting the temperature inside a storage box body, an optical sensor for detecting illuminance, a substance detection sensor for detecting chemical substances, a movement detection sensor, and the like are provided, and thus, there is a problem that it is not possible to detect changes in the inside of a container stored in the storage box, and because an optical film is attached to an outer surface of an external transparent window, and there is a problem that external light cannot be blocked when the optical film is damaged during use.

The object of the present invention is to solve the above-described problems, and it is an object of the present invention to provide a variable light transmission panel and a door having the same through which an article inside a body can be confirmed from the outside by blocking light incident from the outside of a storage box for storing dangerous substances such as chemicals, volatile substances, explosive substances, and chemical substances, which react to external light, in a school, a laboratory, a hospital, an aging room, and the like and allowing external light to pass therethrough using light irradiated from the inside of a door.

It is another object of the present invention to provide a variable light transmission panel and a door having the same capable of reducing power consumption by detecting the movement (a touch, tapping, or the like of a user) at a door to allow a light-emitting member to operate.

It is still another object of the present invention to provide a variable light transmission panel and a door including the same capable of preventing damage to equipment by supplying and blocking power according to an opening and closing operation of a door in a contact manner.

Technical Solution

In order to achieve the above object, a variable light transmission panel according to the present invention includes a glass or acrylic plate that allows external light to pass therethrough, and a sheet attached to the glass or acrylic plate and made of a thermoplastic resin of polymethyl methacrylate (PMMA) or polycarbonate (PC) and nano-sized dyes, wherein a plurality of nano-sized pores are provided in the sheet, and by irradiating light toward an outer periphery of the glass or acrylic plate, external light passes through the plurality of nano-sized pores to maintain a bright state.

In the variable light transmission panel according to the present invention, a size of each of the nano-sized pores may be in a range of 20 to 50 nm, and an arithmetic average roughness (Ra) of a surface of the sheet may be in a range of 1.2 to 1.9 nm.

In order to achieve the above object, a door according to the present invention is a door including a frame and mounted on a body by a hinge so as to be opened and closed, the door including a glass member provided on a front surface side of the frame, a protective panel provided on an inner surface side of the frame, a variable light transmission panel provided between the glass member and the protective panel and including a glass or acrylic plate that allows external light to pass therethrough and a sheet that is attached to the glass or acrylic plate and made of a thermoplastic resin of polymethyl methacrylate (PMMA) or polycarbonate (PC) and nano-sized dyes, a light-emitting member provided between the protective panel and the variable light transmission panel, and a power supply member configured to supply power to the light-emitting member.

Further, in the door according to the present invention, the power supply member may include a first power supply member coupled to the hinge and a second power supply member coupled to the frame, an electrical connection between the first power supply member and the second power supply member may be formed when the door is closed, and the electrical connection between the first power supply member and the second power supply member may be cut off when the door is open.

Further, in the door according to the present invention, the first power supply member may include a first protrusion protruding from a first terminal, the second power supply member may include a second protrusion protruding from a second terminal, and power may be supplied to the light-emitting member by the first protrusion being brought into contact with the second terminal and the second protrusion being brought into contact with the first terminal.

Further, in the door according to the present invention, a coupling groove may be provided on a side surface of the hinge, a pair of coupling parts may be provided in the first power supply member, and the first power supply member may be fastened to the hinge by fitting the pair of coupling parts into the coupling groove.

Further, in the door according to the present invention, the light-emitting member may include a substrate, a plurality of light-emitting diode (LED) light sources provided on the substrate, and a diffusion plate, and the plurality of LED light sources may emit light toward the transmittance-variable panel.

Further, in the door according to the present invention, the light-emitting member may include a substrate, a plurality of light-emitting diode (LED) light sources provided on the substrate, and a diffusion plate, and the plurality of LED light sources may emit light toward an outer periphery of the glass or acrylic plate.

Further, in the door according to the present invention, a movement detection member may be provided in the glass member, and the second power supply member may supply power to the light-emitting member when a movement of the glass member is detected by the movement detection member.

Further, in the door according to the present invention, a movement detection member may be provided on an upper portion of the body, and the second power supply member may supply power to the light-emitting member when a movement of a user is detected by the movement detection member.

Advantageous Effects

As described above, in a variable light transmission panel and a door having the same according to the present invention, the variable light transmission panel is provided between a glass member and a protective panel, and a light-emitting member is provided between the protective panel and the variable light transmission panel so that it is possible to obtain an effect that an article inside a body can be confirmed from the outside by blocking light incident from the outside and allowing external light to pass therethrough according to an increase in a light amount by a light-emitting member provided on the inside of a door.

Further, in a variable light transmission panel and a door having the same according to the present invention, it is also possible to obtain an effect that power consumption can be reduced by electrically connecting a first power supply member and a second power supply member when a door is closed, and supplying power to a light-emitting member when information about movement in the door is detected.

Further, in a variable light transmission panel and a door having the same according to the present invention, it is also possible to obtain an effect that equipment damage and an electric shock can be prevented by providing a structure in which an electrical connection between a first power supply member and a second power supply member is formed when a door is closed, and the electrical connection between the first power supply member and the second power supply member is cut off when the door is open.

MODES OF THE INVENTION

The above objects and other objects and new features of the present invention will become more apparent from the description of the present specification and accompanying drawings.

As used herein, the term "frame" refers to one made of a metal material or high-strength plastic having an approximately quadrangular shape to maintain the overall shape of a door, the term "front surface of the frame" refers to a part for opening the door to the outside, and the term "inner surface of the frame" refers to a part facing a body in which an article is stored.

As used herein, the term "variable light transmission panel" is a sheet made of a thermoplastic resin of polymethyl methacrylate (PMMA) or polycarbonate (PC) and nano-sized dyes, and the sheet may be used, for example, by being attached to a glass or acrylic plate or the like that allows external light to pass therethrough.

First, a function of a variable light transmission panel according to the present invention will be described with reference to FIGS. 2 and 3.

FIG. 2 is a view for describing a function of a variable light transmission panel according to the present invention, and FIG. 3 is a photograph illustrating whether light passes through or not according to ON/OFF of a light-emitting member in the variable light transmission panel.

Figure 1:
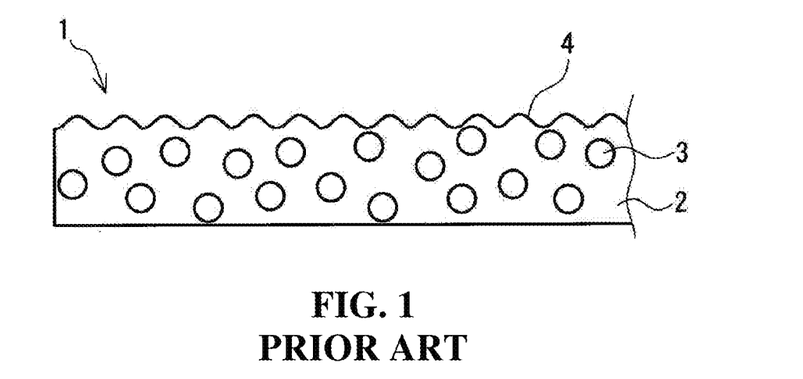
FIG. 1 is a view for describing a state in which a light-emitting diode (LED) module is mounted on a conventional door frame.
Figure 2A:
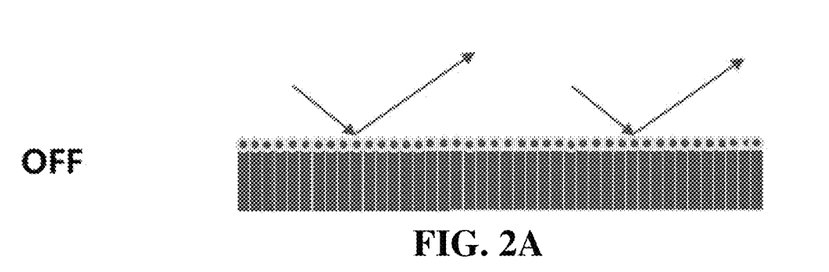
FIG. 2 is a view for describing a function of a variable light transmission panel according to the present invention.
Figure 2B:
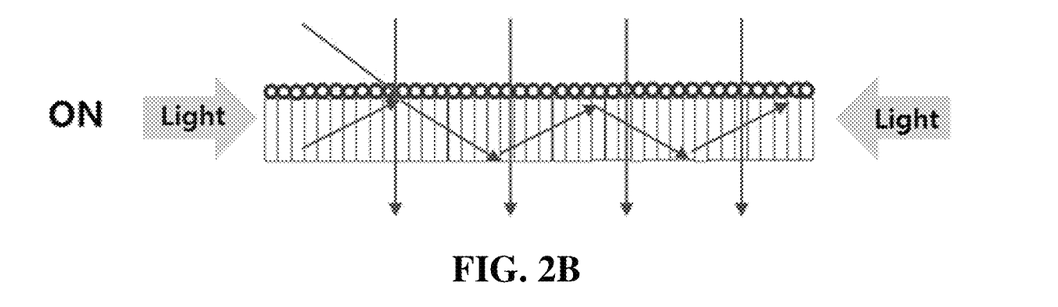
Figure 3A:
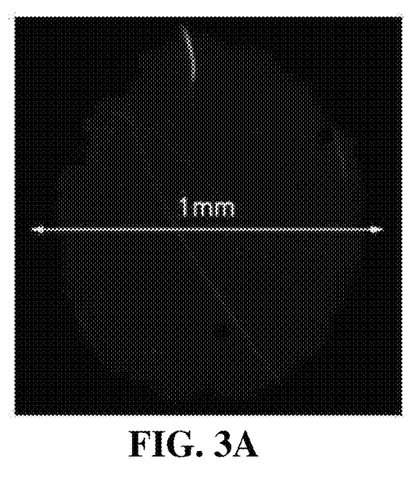
FIG. 3 is a photograph illustrating whether light passes through or not according to ON/OFF of a light-emitting member in the variable light transmission panel.
Figure 3B:
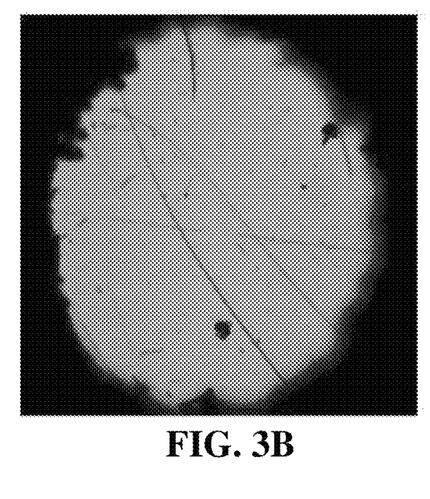

A plurality of nano-sized pores are provided in the variable light transmission panel according to the present invention, and thus, when a light-emitting member is turned off as shown in FIG. 2A, light incident from the outside is blocked, and the variable light transmission panel is maintained in a dark state as shown in FIG. 3A. On the other hand, when the light-emitting member is turned on, as shown in FIG. 2B, due to the principle of polarization, external light passes through the plurality of nano-sized pores due to light irradiation from the light-emitting member toward the outside of the variable light transmission panel, and thus the variable light transmission panel is maintained in a bright state as shown in FIG. 3B.

That is, by applying the variable light transmission panel according to the present invention, an article inside the body can be confirmed from the outside by blocking light incident from the outside and allowing an external light to pass there through according to an increase in the amount of light by the internal light source (light-emitting member).

Next, a structure of a door having the variable light transmission panel according to the present invention will be described with reference to the drawings.

Figure 4:
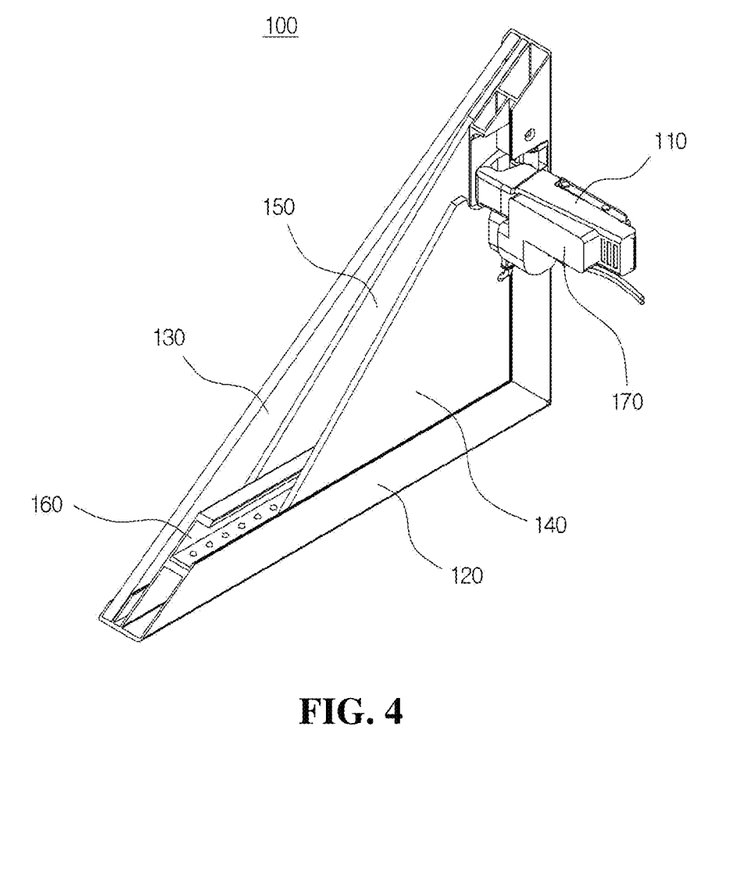
FIG. 4 is a perspective view illustrating a door, a portion of which is cut away, having the variable light transmission panel according to the present invention.
Figure 5:
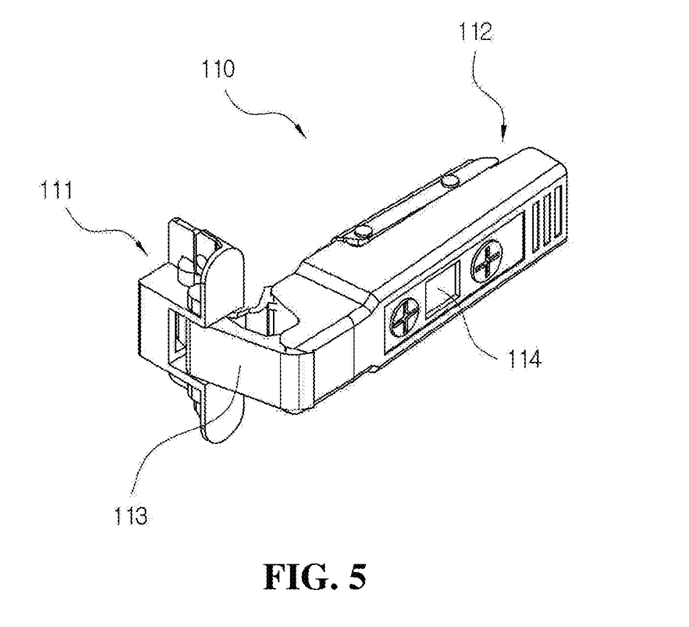
FIG. 5 is a perspective view illustrating a structure of a hinge shown in FIG. 4.
Figure 6:
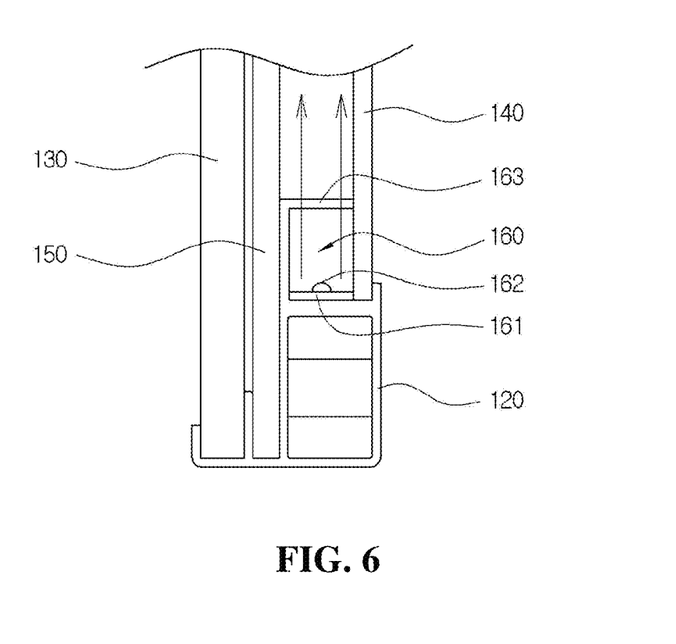
FIG. 6 is a partial front view of an example of the door having the variable light transmission panel shown in FIG. 4.

FIG. 4 is a perspective view illustrating a door, a portion of which is cut away, having the variable light transmission panel according to the present invention, FIG. 5 is a perspective view illustrating a structure of a hinge shown in FIG. 4, and FIG. 6 is a partial front view of an example of the door having the variable light transmission panel shown in FIG. 4.

A door 100 having the variable light transmission panel according to the present invention is a door 100, as shown in FIG. 4, including a frame 120 and mounted on a body with a hinge 110 so as to be opened and closed, and the door 100 includes a glass member 130 provided on a front surface side of the frame 120, a protective panel 140 provided on an inner surface side of the frame 120, a variable light transmission panel 150 provided between the glass member 130 and the protective panel 140 and including a sheet made of a thermoplastic resin of polymethyl methacrylate (PMMA) or polycarbonate (PC) and nano-sized dyes, a light-emitting member 160 provided between the protective panel 140 and the variable light transmission panel 150, and a power supply member 170 configured to supply power to the light-emitting member 160.

The body functions as a storage box for storing dangerous substances such as chemicals, volatile substances, explosive substances, chemical substances, which react to external light, in a school, a laboratory, a hospital, an aging room, and the like, and the door 100 is an opening/closing member provided on the front surface of the body for opening and closing the storage box as described above, and provided to be rotatable in a front direction of the body.

As shown in FIG. 5, the hinge 110 includes a door fixing member 111, a body fixing member 112, and a link member 113 that is rotatably provided and connects the door fixing member 111 and the body fixing member 112.

As shown in FIG. 4, the door fixing member 111 is fixed to the frame by a fastening member such as a screw, the body fixing member 112 includes a fixture coupled to the body, a fastening bolt fastened to the fixture, a coupling part fastened to the fastening bolt, and a pair of door adjustment bolts for adjusting the amount of protrusion of the body fixing member 112, and the link member 113 elastically fastens the door fixing member 111 and the body fixing member 112 through an opening and closing spring to open and close the door 100.

A coupling groove 114 is provided at one side of the body fixing member 112. That is, as shown in FIG. 5, the coupling groove 114 may be provided between the pair of door adjustment bolts.

In order to maintain the overall shape of the door 100, as shown in FIGS. 4 and 6, the frame 120 may be made of an approximately quadrangular-shaped metal material, high-strength plastic, or wood material, and a packing member such as silicone, rubber, or the like for sealing the body may be provided on a circumferential portion of the frame 120. In addition, in the above description, the frame 120 is described as having a quadrangular shape, but is not limited thereto, and may be provided in a shape such as a circular shape or an elliptical shape.

As shown in FIGS. 4 and 6, the glass member 130 is tempered glass provided on a front surface side of the frame 120 to protect the variable light transmission panel 150, and the glass member 130 may include a movement detection member. That is, the movement detection member is provided on an inner side of the glass member 130, detects the movement of the glass member 130 caused by a user touching or tapping the glass member 130, and transmits a detected signal to the light-emitting member 160. The movement detection member may be wired or wirelessly connected to the light-emitting member 160 using a typical method.

In addition, although the structure in which the movement detection member is provided on the glass member 130 has been described above, the present invention is not limited thereto, and the movement detection member may be provided on one side of the frame 120, a handle part of the door 100, or an upper portion of the body.

The protective panel 140 is a glass member provided on the inner surface side of the frame 120 in order to protect the variable light transmission panel 150. In addition, although a configuration in which the glass member 130 and the protective panel 140 are made of tempered glass has been described above, the present invention is not limited thereto, and a transparent member that allows light to pass therethrough, for example, acrylic or the like, may be applied to the glass member 130 and the protective panel 140. As shown in FIG. 6, the glass member 130 and the protective panel 140 may be fitted into the frame 120 having a plurality of insertion portions and molded with a silicone resin.

Figure 7:
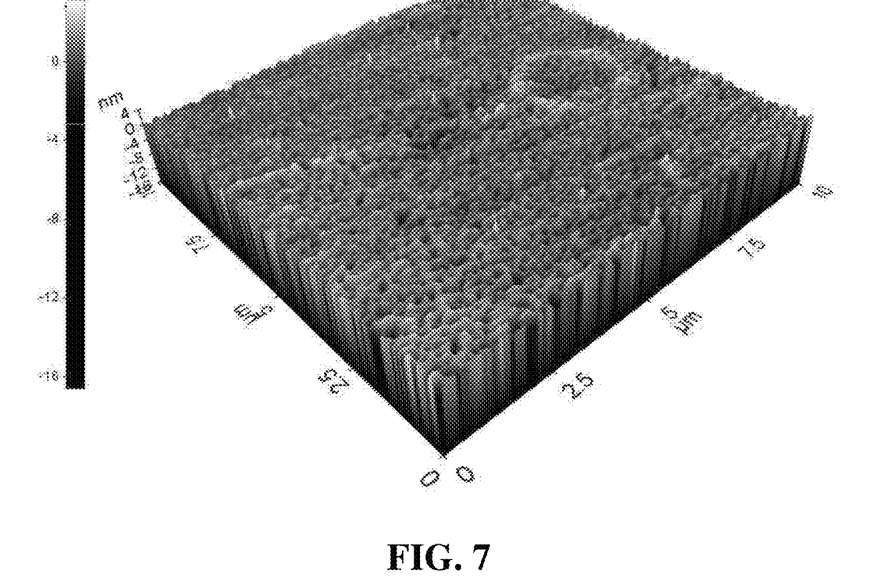
FIG. 7 is a view illustrating a surface state of the variable light transmission panel shown in FIG. 4.

As shown in FIG. 7, a plurality of nano-sized pores are provided in the variable light transmission panel 150 to block light incident from the outside of the door 100, and when the amount of light is increased between the variable light transmission panel 150 and the protective panel 140 due to light irradiated from the light-emitting member 160, external light may pass through the plurality of nano-sized pores so that an article inside the body can be confirmed from the outside. FIG. 7 is a view illustrating a surface state of the variable light transmission panel shown in FIG. 4.

As shown in FIG. 7, the variable light transmission panel 150 includes a sheet made of a thermoplastic resin of polymethyl methacrylate (PMMA) or polycarbonate (PC) and nano-sized dyes, a plurality of nano-sized pores each having a size of 20 to 50 nm are formed in the sheet, and an arithmetic average roughness (Ra) of a surface of the sheet is 1.2 to 1.9 nm. The sheet may be used, for example, by being attached to a glass or acrylic plate or the like that allow external light to pass therethrough.

The plurality of nano-sized pores provided in the variable light transmission panel 150 are arranged to face the protective panel 140. As shown in FIG. 6, the variable light transmission panel 150 may also be fitted into the frame 120 having a plurality of insertion portions and may be molded with a silicone resin.

Accordingly, when the light-emitting member 160 is turned on, as shown in FIG. 2B, due to the principle of polarization, external light passes through the plurality of nano-sized pores due to light irradiation from the light-emitting member toward the variable light transmission panel and thus the variable light transmission panel 150 is maintained in a bright state as shown in FIG. 3B so that a user may confirm an article inside the body from the outside.

Figure 8:
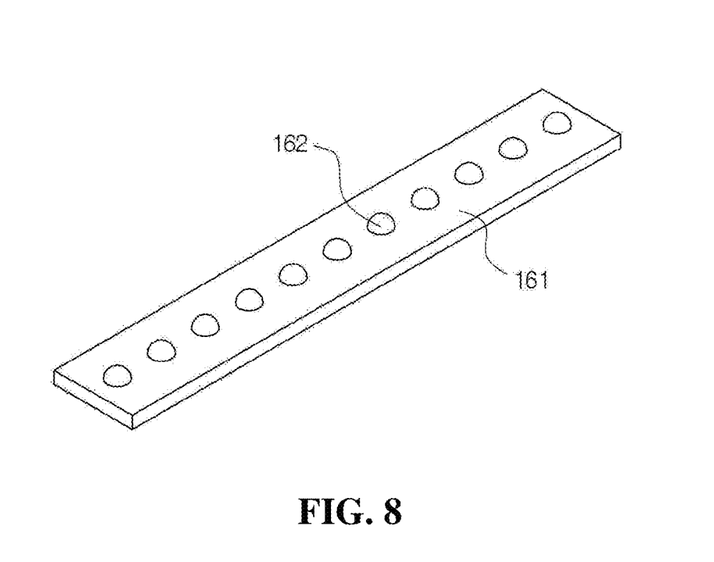
FIG. 8 is a view illustrating a light-emitting member shown in FIG. 6.

As shown in FIGS. 2 and 4, the light-emitting member 160 is provided on a lower portion of the transmittance-variable panel 150, and as shown in FIG. 8, the light-emitting member 160 includes a substrate 161, a plurality of LED light sources 162 provided on the substrate 161, and a diffusion plate 163 provided on the plurality of LED light sources 162. FIG. 8 is a view illustrating the light-emitting member shown in FIG. 6. In addition, in FIG. 4, the structure in which the light-emitting member 160 is provided only on the lower portion of the frame 120 is illustrated, but the present invention is not limited thereto, and the light-emitting member 160 may also be provided on an upper portion of the frame 120. In addition, the light-emitting member 160 may be provided in a pair at the upper and lower portions of the frame 120 or may be provided in two pairs on each of side surfaces having a quadrangular shape. That is, the light-emitting member 160 may be provided as a plurality depending on the transmittance of the transmittance-variable panel 150 or the size of the door 100.

The plurality of LED light sources 162 is provided to emit light toward the variable light transmission panel 150 by adjusting a light emission angle. The substrate 161 may include a voltage change circuit configured to change the commercial power supplied from the body into a voltage suitable for the LED light source, a switching circuit configured to switch the supply of power from the power supply member 170 to the plurality of LED light sources 162 according to a detected signal by the movement detection member, and a timer configured to operate the switching circuit for a predetermined period of time. In addition, the LED light sources 162 may be provided to have an output having an optimal light reflectance according to the size and material of the plurality of nano-sized pores provided in the variable light transmission panel 150.

The diffusion plate 163 may have a lens function so that light emitted from the plurality of LED light sources 162 faces an outer periphery of the transmittance-variable panel 150 as indicated by arrows in FIG. 6.

The power supply member 170 configured to supply power to the light-emitting member 160 will be described with reference to FIGS. 9 and 10.

Figure 9:
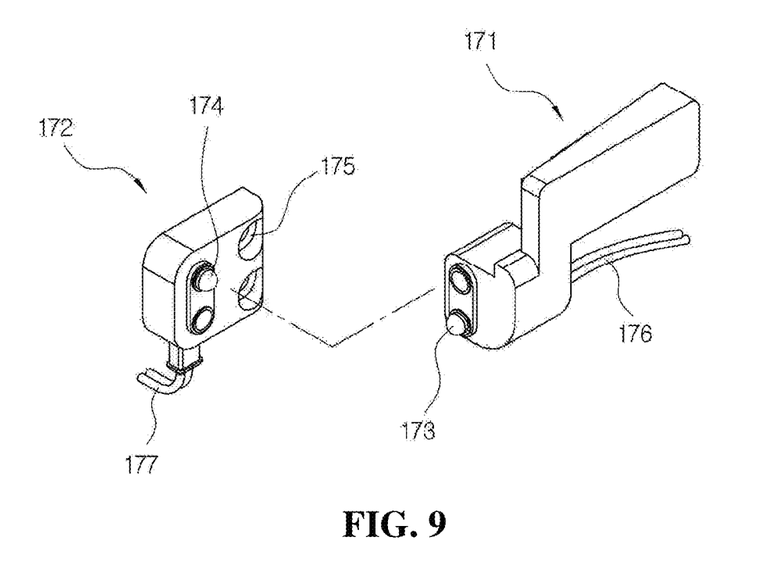
FIG. 9 is a perspective view illustrating a structure of a power supply member shown in FIG. 4.
Figure 10:
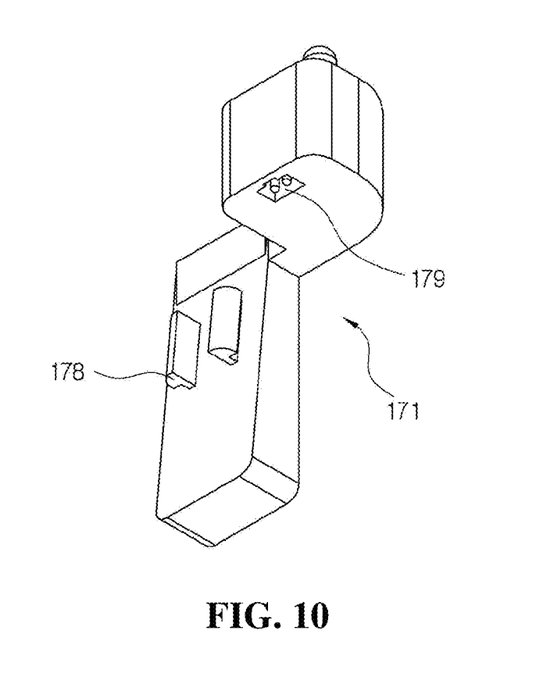
FIG. 10 is a perspective view illustrating a structure of a first power supply member shown in FIG. 9.

FIG. 9 is a perspective view illustrating a structure of the power supply member shown in FIG. 4, and FIG. 10 is a perspective view illustrating a structure of a first power supply member shown in FIG. 9.

As shown in FIGS. 4 and 9, the power supply member 170 includes a first power supply member 171 coupled to the hinge 110 and a second power supply member 172 coupled to the frame 120, and when the door 100 is closed, an electrical connection between the first power supply member 171 and the second power supply member 172 is formed, and when the door 100 is open, the electrical connection between the first power supply member 171 and the second power supply member 172 is cut off.

As shown in FIGS. 9 and 10, the first power supply member 171 includes a first protrusion 173 protruding from a first terminal, a first cable 176 electrically connected to the first terminal to receive power from the body, and a pair of coupling parts 178, and the first cable 176 is coupled to a connection jack 179.

The first terminal and the first protrusion 173 are provided to be electrically insulated from each other, and the first power supply member 171 is fastened to the hinge 110 by fitting the pair of coupling parts 178 into the coupling groove 114 provided in a body fixing part 112.

As shown in FIGS. 4 and 9, the second power supply member 172 includes a second protrusion 174 protruding from a second terminal, a screw hole 175 provided to fix the second power supply member 172 to the frame 120 with a screw or the like, and a second cable 177 electrically connected to the first terminal to supply power to the light-emitting member 160. The second terminal and the second protrusion 174 are provided to be electrically insulated from each other, and power may be supplied to the light-emitting member 160 by the first protrusion 173 being brought into contact with the second terminal and the second protrusion 174 being brought into contact with the first terminal. That is, the first terminal is electrically insulated from the first protrusion 173 and electrically connected to the second protrusion 174. In addition, the second terminal is also electrically insulated from the second protrusion 174 and electrically connected to the first protrusion 173. The first protrusion 173 and the second protrusion 174, which are described above, are provided to have, for example, functions of a positive (+) terminal and a negative (−) terminal.

As described above, by providing the first protrusion 173 to the first terminal and providing the second protrusion 174 to the second terminal, an electric shock may be prevented when in use, and the electrical connection state may be maintained even in the repetitive opening/closing operation of the door 100.

Thus, when the door 100 is opened from the body, the first protrusion 173 and the second protrusion 174 are spaced apart from each other so that the supply of power to the light-emitting member 160 is cut off, and when the door 100 is closed to the body, the first protrusion 173 and the second protrusion 174 are brought into contact with the first terminal and the second terminal, respectively, so that the voltage is maintained in a standby voltage state through the operation of the switching circuit.

Thereafter, when the user touches or taps the glass member 130, the movement detection member detects the movement, and information on the movement detection is transmitted to the light-emitting member 160 so that the switching circuit is turned on. Accordingly, when the plurality of LED light sources 162 emit light, since the amount of light between the variable light transmission panel 150 and the protective panel 140 increases, external light passes through a plurality of nano-sized pores provided in the variable light transmission panel 150 so that an article inside the body can be confirmed from the outside. The light emission of the plurality of LED light sources 162 may operate only for a preset period of time with a timer configured to operate the switching circuit only for a predetermined period of time.

As described above, according to the present invention, since the plurality of LED light sources 162 emit light only for a preset period of time through the operation of the movement detection member and the timer, power consumption may be reduced.

Next, another embodiment of the present invention will be described with reference to FIGS. 11 to 13.

Figure 11:
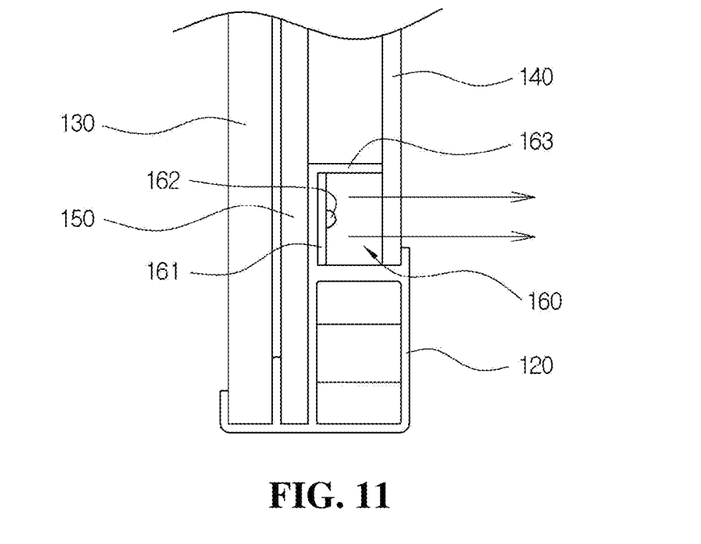
FIG. 11 is a partial front view of another example of the door having the variable light transmission panel shown in FIG. 4.
Figure 12:
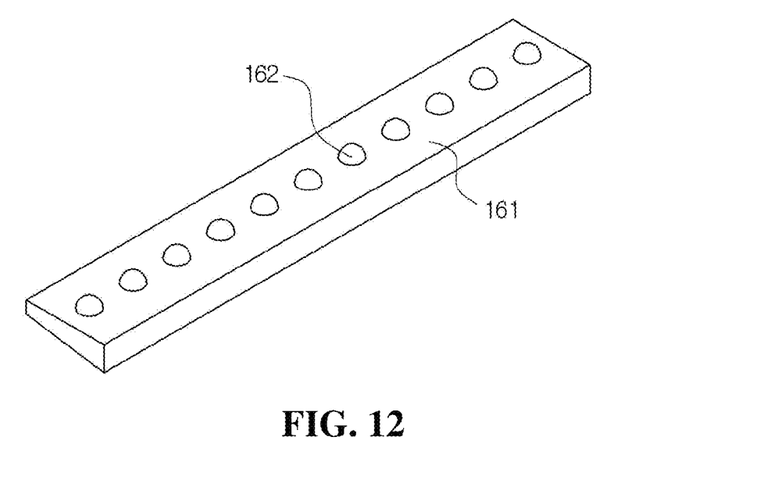
FIG. 12 is a view illustrating another example of a light-emitting member of a variable light transmission panel according to the present invention.
Figure 13:
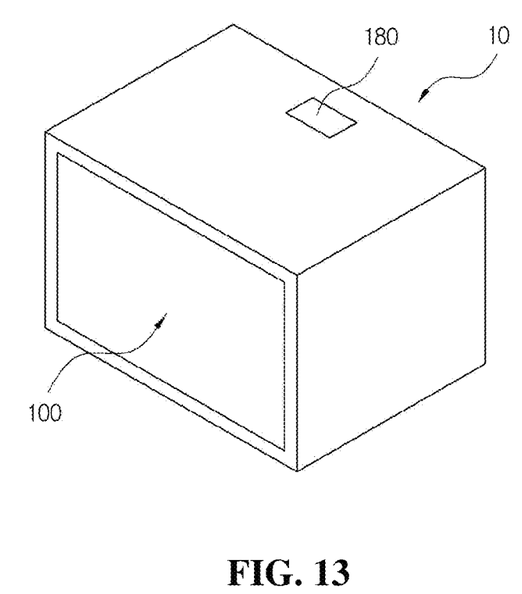
FIG. 13 is a view illustrating an example of a movement detection member mounted on a body having the variable light transmission panel according to the present invention.

FIG. 11 is a partial front view of another example of a door having the variable light transmission panel shown in FIG. 4, FIG. 12 is a view illustrating another example of a light-emitting member of a variable light transmission panel according to the present invention, and FIG. 13 is a view illustrating an example of a movement detection member mounted on the body having the variable light transmission panel according to the present invention.

In the embodiment described in FIGS. 6 and 7, the substrate 161 has a flat structure, and the plurality of LED light sources 162 are directed toward an outer periphery of the variable light transmission panel 150, but as indicated by arrows in FIG. 11, the plurality of LED light sources 162 may be provided to face the inside of the body.

In addition, as shown in FIG. 12, the plurality of LED light sources 162 may be provided to face the variable light transmission panel 150 by providing the substrate 161 in a trapezoidal shape. Thus, the installation of the light-emitting member 160 may be easily realized by applying the substrate 161 as shown in FIG. 11.

In addition, although the structure in which the movement detection member is provided on one side of the frame 120 has been described above, as shown in FIG. 13, a structure in which a movement detection member 180 is provided on an upper portion of a body 10 and causes the light-emitting member 160 to operate may also be applied. That is, a structure may be provided in which, when a user's movement, for example, the passing of a user's palm or the like, is detected by the movement detection member 180, the second power supply member 172 supplies power to the light-emitting member 160.

Although the present invention has been described in detail with reference to the embodiments, it is to be understood that the present invention is not limited to the embodiments, and various modifications are possible to the extent of not deviating from the gist of the invention.

That is, in the above description, as shown in FIG. 6, the structure in which the variable light transmission panel 150 is mounted in a state parallel to the glass member 130 and LEDs of the light-emitting member 160 faces an edge of the variable light transmission panel 150 is illustrated, but the present invention is not limited thereto, and the variable light transmission panel 150 may be provided to be mounted obliquely with respect to the light-emitting member 160 so that light irradiated from the light-emitting member 160 passes through the glass member 130 through the plurality of nano-sized pores.

In addition, although the structure in which the first protrusion 173 is provided in the first terminal and the second protrusion 174 is provided in the second terminal has been described above, the present invention is not limited thereto, and a structure in which the first protrusion 173 and the second protrusion 174 are provided on either the first terminal or the second terminal may also be applied.

INDUSTRIAL APPLICABILITY

By using a variable light transmission panel and a door having the same according to the present invention, an article inside the body can be confirmed from the outside by blocking light incident from the outside and allowing external light to pass therethrough according to an increase in the amount of light by a light-emitting member provided on the inside of a door.

The invention claimed is:
1. A variable light transmission panel comprising:
a glass or acrylic plate that allows external light to pass therethrough; and
a sheet attached to the glass or acrylic plate and made of a thermoplastic resin of polymethyl methacrylate (PMMA) or polycarbonate (PC) and nano-sized dyes,
wherein a plurality of nano-sized pores are provided in the sheet, and
by irradiating light toward an outer periphery of the glass or acrylic plate, external light passes through the plurality of nano-sized pores to maintain a bright state.
2. The variable light transmission panel of claim 1, wherein a size of each of the nano-sized pores is in a range of 20 to 50 nm, and an arithmetic average roughness (Ra) of a surface of the sheet is in a range of 1.2 to 1.9 nm.

3. A door including a frame and mounted on a body by a hinge so as to be opened and closed, the door comprising:
   a glass member provided on a front surface side of the frame;
   a protective panel provided on an inner surface side of the frame;
   a variable light transmission panel provided between the glass member and the protective panel;
   a light-emitting member provided between the protective panel and the variable light transmission panel; and
   a power supply member configured to supply power to the light-emitting member,
   wherein the variable light transmission panel includes a glass or acrylic plate that allows external light to pass therethrough, and a sheet attached to the glass or acrylic plate and made of a thermoplastic resin of polymethyl methacrylate (PMMA) or polycarbonate (PC) and nano-sized dyes,
   a plurality of nano-sized pores are provided in the sheet, and
   by irradiating light toward an outer periphery of the glass or acrylic plate, external light passes through the plurality of nano-sized pores to maintain a bright state.

4. The door of claim 3, wherein a size of each of the nano-sized pores is in a range of 20 to 50 nm, and an arithmetic average roughness (Ra) of a surface of the sheet is in a range of 1.2 to 1.9 nm.

5. The door of claim 4, wherein the power supply member includes a first power supply member coupled to the hinge and a second power supply member coupled to the frame,
   an electrical connection between the first power supply member and the second power supply member is formed when the door is closed, and
   the electrical connection between the first power supply member and the second power supply member is cut off when the door is open.

6. The door of claim 5, wherein
   the first power supply member includes a first protrusion protruding from a first terminal,
   the second power supply member includes a second protrusion protruding from a second terminal, and
   power is supplied to the light-emitting member by the first protrusion being brought into contact with the second terminal and the second protrusion being brought into contact with the first terminal.

7. The door of claim 5, wherein
   a coupling groove is provided on a side surface of the hinge,
   a pair of coupling parts are provided in the first power supply member, and
   the first power supply member is fastened to the hinge by fitting the pair of coupling parts into the coupling groove.

8. The door of claim 5, wherein
   the light-emitting member includes a substrate, a plurality of light-emitting diode (LED) light sources provided on the substrate, and a diffusion plate, and
   the plurality of LED light sources emit light toward the variable light transmission panel.

9. The door of claim 5, wherein
   the light-emitting member includes a substrate, a plurality of light-emitting diode (LED) light sources provided on the substrate, and a diffusion plate, and
   the plurality of LED light sources emit light toward an outer periphery of the glass or acrylic plate.

10. The door of claim 5, wherein
    a movement detection member is provided in the glass member, and
    the second power supply member supplies power to the light-emitting member when a movement of the glass member is detected by the movement detection member.

11. The door of claim 5, wherein
    a movement detection member is provided on an upper portion of the body, and
    the second power supply member supplies power to the light-emitting member when a movement of a user is detected by the movement detection member.

* * * * *